US009020972B1

(12) United States Patent
Gaun et al.

(10) Patent No.: US 9,020,972 B1
(45) Date of Patent: *Apr. 28, 2015

(54) SYSTEM AND METHOD FOR CONSTRUCTING A DATABASE INSTRUCTION

(75) Inventors: Mark Zhenguo Gaun, Cupertino, CA (US); Karthik M. Nagaraj, Livermore, CA (US); Sam Ka-Shing Wu, Mountain View, CA (US); Ying Wang, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 13/196,857

(22) Filed: Aug. 2, 2011

(51) Int. Cl.
*G06F 17/30* (2006.01)
(52) U.S. Cl.
CPC ................................ *G06F 17/30398* (2013.01)
(58) Field of Classification Search
USPC ........................................................ 707/779
See application file for complete search history.

(56) References Cited

U.S. PATENT DOCUMENTS

| 6,826,727 | B1 | 11/2004 | Mohr et al. |
| 7,152,062 | B1 | 12/2006 | Draper et al. |
| 2005/0182758 | A1 | 8/2005 | Seitz et al. |
| 2008/0059415 | A1* | 3/2008 | Bakalash et al. ................. 707/2 |
| 2008/0059950 | A1 | 3/2008 | Seitz et al. |
| 2010/0005090 | A1* | 1/2010 | Bayliss ............................ 707/5 |
| 2012/0290620 | A1 | 11/2012 | Guan et al. |

OTHER PUBLICATIONS

Springsource, Data access using JDBC, Apr. 19, 2010.*
Wikipedia, Oracle BI Publisher, Jul. 26, 2010, Oct. 3, 2013.*
Oracle Business Intelligence Publisher Report Designer's Guide—Building a Data Template, Version 10.1.3.4, accessed Oct. 3, 2013.*
Crume, Named Parameters for PreparedStatement_JavaWorld, Apr. 3, 2007.*
PHP, Function arguments—Manual, accessed Sep. 13, 2013 <http://php.net/manual/en/functions.arguments.php>.
Java Optional method arguments/default values—AnandTech Forums, published 2004, accessed Sep. 13, 2013 < http://forums.anandtech.com/showthread.php?t=1231799>.
Gächter, Named Paramaters within JDBC, Oct. 17, 2008 < http://www.akadia com/services/ora_jdbc_parameter.html>.
Huang, et al., Admire: An Adaptive Data Model for Meta Search Engines, Computer Networks, Jun. 2000, pp. 431-448, vol. 33, No. 1-6.

* cited by examiner

*Primary Examiner* — William Spieler
(74) *Attorney, Agent, or Firm* — Armstrong Teasdale LLP

(57) ABSTRACT

A system and method of the subject technology automatically constructs a database instruction from a template instruction, including one or more variable tokens, and one or more document object representations, each including an object type and a user-generated parameter. The one or more variable tokens in the template instruction are substituted by the user-generated parameter of a corresponding document object representation when the type of a respective variable token is matched to the type of the corresponding document object representation.

23 Claims, 4 Drawing Sheets

SYSTEM AND METHOD FOR CONSTRUCTING A DATABASE INSTRUCTION

TECHNICAL FIELD

The subject technology relates generally to database systems, namely, dynamically constructing database instructions.

BACKGROUND

Data of all varieties is stored in databases. Access to data through present systems requires knowledge of database query languages, database Application Programming Interfaces (APIs), and/or programming languages. Querying a database for information requires a database administrator or other person with programming abilities to construct a database instruction to access and query the database for information. In the case of software programs written to interact with a database, the addition of new information requires the system code to be modified to retrieve the new information.

SUMMARY

A computer implemented method of constructing a database instruction is disclosed. In one aspect, the method includes a system for constructing a database instruction. In one aspect, the system includes a memory including machine-executable instructions operable, when executed, to perform as a virtual query generation engine. The system further includes a presentation interface, and one or more processors operable to receive data from the presentation interface, execute the machine-executable instructions, and read and write to the memory. In this regard, the one or more processors are further operable to receive a machine-readable document template including a template instruction, the template instruction including a command keyword, a variable descriptor token associated with the command keyword, and a target clause, wherein the variable descriptor token includes a token attribute defining a variable type, and to receive a document object representation including an object type and an user-generated parameter, match the object type and the token attribute, and generate the database instruction from the template instruction, the database instruction including a command parameter generated by substituting the variable descriptor token with the user generated parameter.

A machine-readable medium is also disclosed, the machine-readable medium having machine-executable instructions stored thereon, which when executed by a machine or computer cause the machine or computer to perform a method for constructing a database instruction. In one aspect, the method includes receiving a machine-readable document template including a template instruction, the template instruction including a command keyword, a variable descriptor token associated with the command keyword, and a target clause, wherein the variable descriptor token includes a token attribute defining a variable type. The method further includes receiving a document object representation including an object type and an user-generated parameter, matching the object type and the token attribute, and generating the database instruction from the template instruction, the database instruction including a command parameter generated by substituting the variable descriptor token with the user generated parameter.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
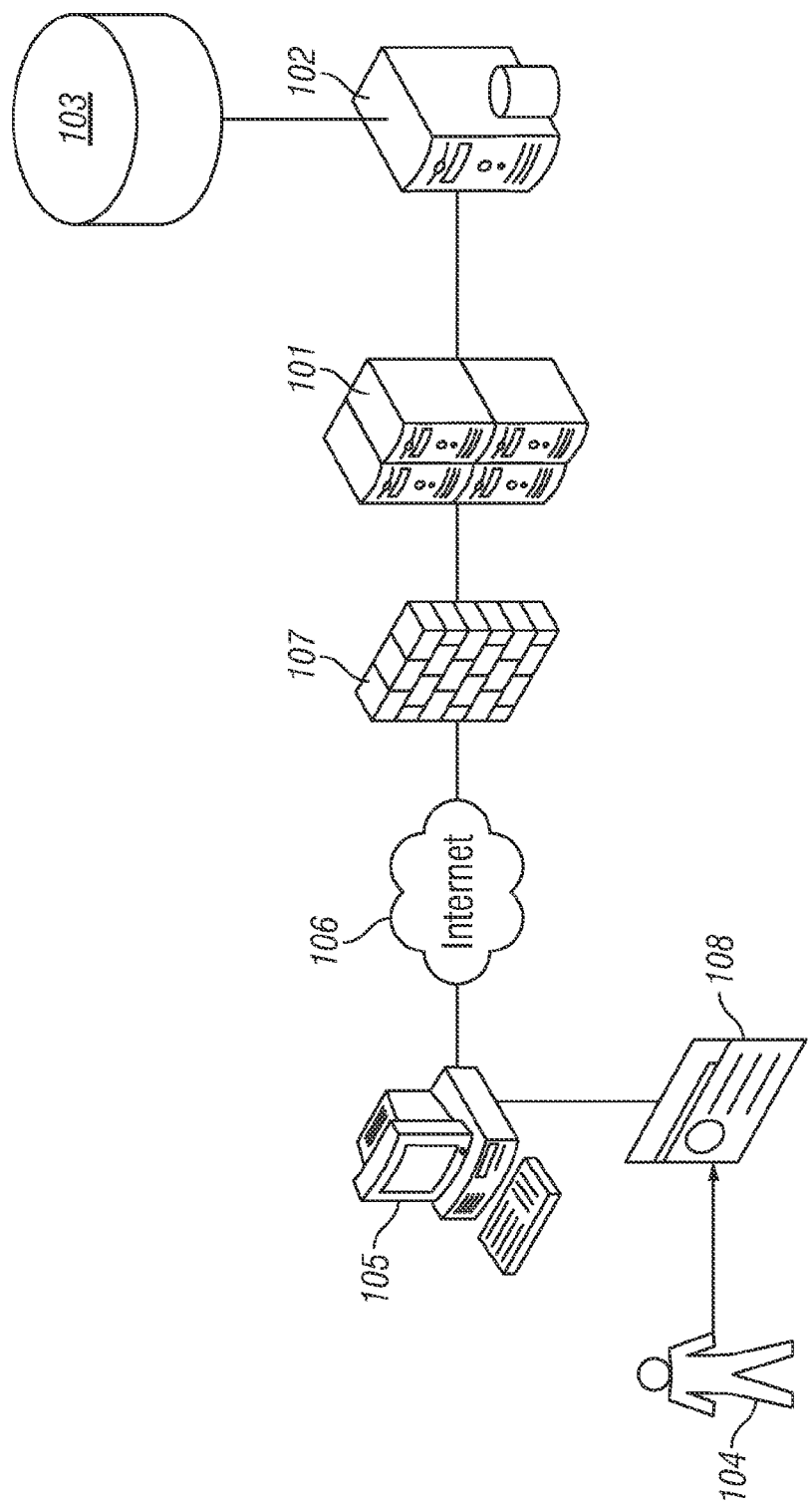
FIG. 1 is a diagram illustrating server and database components of a system for dynamically constructing a database instruction according to one aspect of the subject technology.

This application is related to U.S. patent application Ser. No. 13/105,016, filed May 11, 2011, which is incorporated by reference herein in its entirety. The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Current systems employing complex database queries must be preprogrammed with a specific database query structure prior to execution. A significant change to the structure typically requires further programming and/or recompilation of system code, especially in instances where the query is complex and/or incorporates one or more aggregate functions. Thus, there is a need for a system that has the ability to dynamically create complex database queries, including queries using aggregate functions, without reengineering or recompilation of system code. The subject technology provides a computer implemented system and method for enabling an end-user with little or no knowledge of database programming to create a complex database query that includes parameters selected from variable values at the time of creation. For example, the system may enable a user to select several date ranges from a user interface at runtime to include in a query of a sum of revenues. The query may return the sum of revenues stored in a database based on the selected date ranges, or compare the sum of revenues from two different ranges.

In one example, a report may be generated providing revenue in a time period together with last year's revenue of the same period. Normally, a user would need to create a table with a column to hold the revenue for each year:

TABLE 1

Exemplary Database Table Including Daily Revenue Over Two Years

| date | revenue_this_year | revenue_last_year |
|---|---|---|
| Nov. 1, 2010 | 100 | 98 |
| Nov. 2, 2010 | 105 | 99 |
| Nov. 3, 2010 | 104 | 97 |

Table 1 includes three columns, a first column for date, a second column for the present year's revenue, and a third column for the last year's revenue. To create a report, a database query may take the form:
  select date, sum (revenue_this_year), sum (revenue_last_year) from revenue
  where date <'Nov. 4, 2010' and date >='Nov. 1, 2010 '

The previously described method, however, may limit resources by requiring daily revenue data to be stored in a separate column for each calendar year. One solution may define a variable which represents a user entered value, and/or a function that calculates a value automatically (for example, an aggregate function that calculates a "quarter end date" or "quarter start date"). In this manner, the table may be defined with only one revenue column:

TABLE 2

Exemplary Database Table Including Daily Revenue Over Two Years

| date | revenue |
|---|---|
| Nov. 1, 2009 | 98 |
| Nov. 2, 2009 | 99 |
| Nov. 3, 2009 | 97 |
| ... | ... |
| Nov. 1, 2010 | 100 |
| Nov. 2, 2010 | 105 |
| Nov. 3, 2010 | 104 |

Thus, from Table 2, the following query may be constructed:
  SELECT date, sum(if(date>=variable_from and date <variable_to, revenue, 0)) AS revenue_this_year, sum(if (date>=variable_from −365 and date <variable_to −365, revenue, 0)) AS revenue_last_year FROM revenue Accordingly, in one aspect, the values for variable_from and variable_to may be entered, and the final result viewed through a user interface.

FIG. 1 is a diagram illustrating server and database components of a system for dynamically constructing a database instruction according to one aspect of the subject technology. To achieve a solution to the previously described problem, a system compatible with the subject technology includes one or more servers 101 and a database server 102 for the storing and reporting of data in a database 103. A user 104 may use a computer 105 (for example a personal computer, PDA, Smartphone or the like) to connect to one or more servers 101 via a network 106 (for example, the Internet, LAN/WAN, or the like). In some aspects, a firewall 107 may exist between network 106 and the one or more servers 101. User 104 may interact with a user interface 108 (for example, web page, presentation layer, or other screen), presented to computer 105 by the one or more servers 101, and having controls (for example, drop down lists, selection choices, text inputs or the like) for entering parameters to be used to query database 103.

One or more servers 101 may include and/or use a collection of one or more text-based document instruction templates, each providing the general format of a database query. The templates may be stored, for example, in a memory of one or more servers 101 and/or in database 103. In one aspect, one or more servers 101 are operable to receive user-generated data values from user interface 108 (for example, via a form POST or QUERY command).

A user-generated data value may be defined as any data value and/or variable received from user interface 108, including as a result of direct input or selection from user 104 or from an element of user interface 108 without the knowledge of user 104. In one aspect, user interface 108 may include a template of multiple elements, including variable elements (for example, drop down lists, text boxes, radio buttons, and the like, that may be mapped to one or more variables or memory-resident document objects (for example, a document object variable 203, described below). One or more servers 101 may be operable to associate the user-generated data values with a designated instruction template to create the database instruction. One or more servers 101 may then transmit the database instruction to database server 102 for execution to perform the instruction (for example, query) on database 103. In other aspects, user 104 may not be a person, but, rather, may be an external system (for example, another server or computer system) and user interface 108 may include a web-service or like interface for receiving data from external system 104.

A database instruction generated by one or more servers 101 may be a text base query, such as a Structured Query Language (SQL) statement. Thus, even though user 104 may not understand SQL or any other database query language, based on inputs from the user and the database instruction template, the instruction may be constructed. The instruction can then be executed at database server 102 to retrieve from and/or store data to database 103. The results of the instruction (for example, when representative of a database query) may then be received by database server 102 and transmitted to user-interface 108 via one or more servers 101.

A database instruction template includes the general structure of a database instruction and includes certain database language keywords. For example, a SQL-based instruction template may include the keywords "SELECT," "FROM," "WHERE," "GROUP BY," "HAVING," and the like. The instruction template may further include various template-tokens and variables. The values may be assigned to variables based on the input received through user interface 210. The template tokens define certain aspects of the transformation of the instruction template to the generated instructions. A template token may be associated, for example, with one or more variables, and the transformation of a specific template token is based on the assignment of a value to the variables associated with a specific token.

Figure 2:
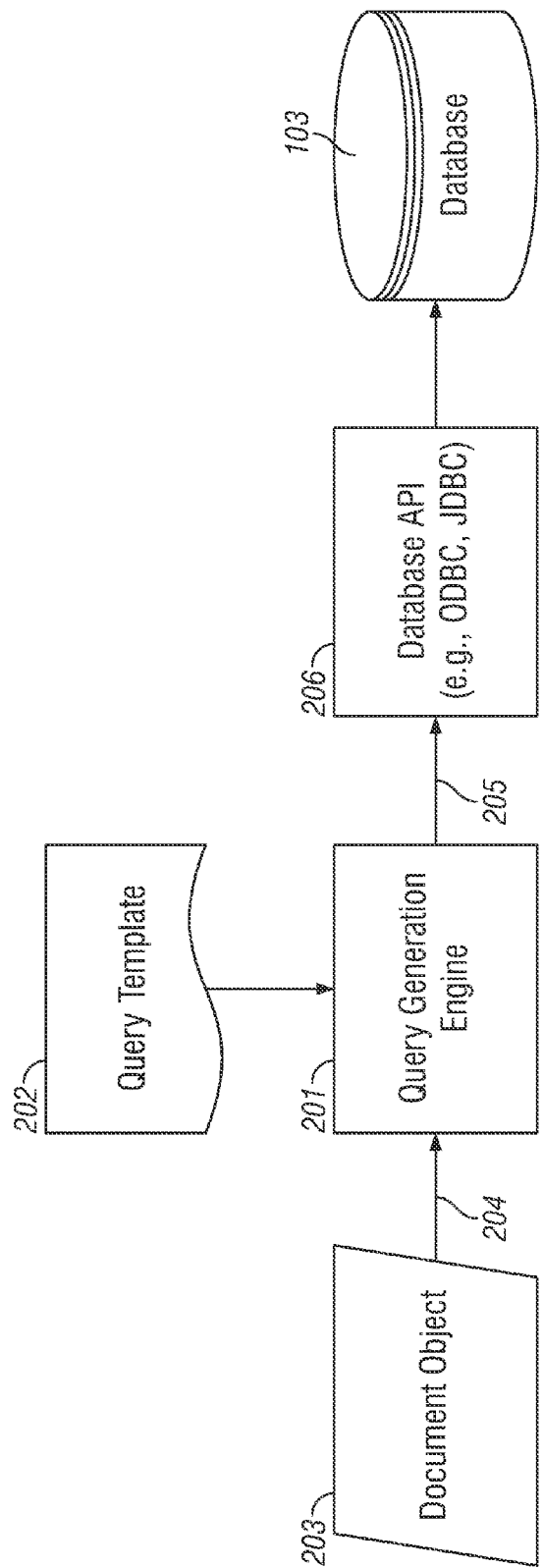
FIG. 2 is an exemplary block diagram illustrating the merging of a document object representative of a user-generated variable and an instruction template into a database instruction generation engine according to one aspect of the subject technology.

FIG. 2 is an exemplary block diagram illustrating the merging of a document object representative of a user-generated variable, and an instruction template into a database instruction generation engine according to one aspect of the subject technology. In one aspect, an instruction generation engine 201 is provided with a machine-readable instruction template 202 (for example, in a memory or on a disk). Instruction generation engine 201 may be implemented as software executed by a processor (see, for example, FIG. 4) on one or more servers 101, such that the processor is operable to receive instruction template 202 as input to create a database instruction. Instruction template 202 may include, for example, a description of the database and reports that may be generated by the template. The description may include a metadata mapping of a database data model to instruction template 202. In one example, the metadata mapping may be an XML file describing the dimensions and measures of the database. An exemplary XML file is as follows:

```
<dimensions>
    <dimension name="Sample dimension 1"
        id="sample_dimension_1" type="string">
        </schema_info>
            <sql column="column_name_1"/>
        </schema_info>
    </dimension>
    <dimension name="Sample dimension 2"
        id="sample dimension_2" type="string">
        <schema_info>
            <sql column="column_name_2"/>
        </schema_info>
    </dimension>
</dimensions>
<measures>
    <measure name="Sample measure 1" id="measure_1"
        type="int64">
        <schema_info>
            <sql column="SUM(column_name_3)"/>
        </schema_info>
    </measure>
    <measure name="Sample measure 2" id="measure_2"
        type="int64">
        <schema_info>
            <sql column SUM(column_name_4)"/>
        </schema_info>
    </measure>
</measures>
```

The above exemplary XML file includes two dimension mappings. Sample Dimension 1 is associated with the identification "sample_dimension_1" and the database column "column_name_1." Sample Dimension 2 is associated with the identification "sample_dimension_2" and the database column "column_name_2." Similarly, Sample measure 1 is associated with the identification "measure_1" and the database column "column_name_3." Sample measure 2 is associated with the identification "measure_2" and the database column "column_measure_4."

In some aspects, additional information concerning the data model of database 103 may be specified within the metadata mapping. For example, data constraints may be specified with respect to the various dimensions and measures. Constraint data such as the acceptable range of data in a particular dimension may also be specified. Additionally, the data type of each column may be specified, which may also be used as a data constraint. This constraint data may be used to validate user input received prior to generating the database report.

One exemplary instruction template 202 which may be used in conjunction with the above metadata mapping, may include:

```
<bit_query>
    SELECT
        $COLUMN_SPEC:$sample_dimension_1,
        $COLUMN_SPEC:$sample_dimension_2,
        $COLUMN_SPEC:$sample_measure_1,
        $COLUMN_SPEC:$sample_measure_2,
    FROM
        Table
    WHERE
        $RESTRICTION:DEFAULT=TRUE:$sample_dimension_1 AND
        $RESTRICTION:DEFAULT=TRUE:$sample_dimension_2
    $OPTIONAL:BEGIN
    GROUP BY
        $COLUMN_ALIAS:$sample_dimension_1,
        $COLUMN_ALIAS:$sample_dimension_2
    $OPTIONAL:END
    $OPTIONAL:BEGIN
    HAVING
        $RESTRICTION:DEFAULT=FALSE:$sample_measure_1 OR
        $RESTRICTION:DEFAULT=FALSE:$sample_measure_2
    $OPTIONAL:END
</bit_query>
```

This exemplary instruction template example includes template tokens $COLUMN_SPEC, $COLUMN_ALIAS, $RESTRICTION, and $OPTIONAL. The instruction template also includes variables $sample_measure_1, $sample_measure_2, $sample_dimension_1, and $sample_dimension_2.

$COLUMN_SPEC is a descriptor token and defines a measure or dimension within a report. For example, with respect to the text $COLUMN_SPEC:$sample_dimension_1, presented above, if user 104 has selected a database reference associated with $sample_dimension_1, the transformation of the instruction template will replace the text with the column name associated with the $sample_dimension_1. Thus, as defined by the above date metadata mappings, $COLUMN_SPEC:$sample_dimension_1 may be replaced with the column name "column_name_1." In further aspects, the metadata mapping may also assign an alias identifier to the column. If an alias identifier is assigned, the text $COLUMN_SPEC:$sample_dimension_1, presented may be transformed to "column_name AS column_name_alias." If the variable $sample_dimension_1is not selected, the text $COLUMN_SPEC:$sample_dimension_1 may be omitted from the database instruction when the instruction template is transformed.

With respect to the token $COLUMN_SPEC, assignment of a value to an associated variable (for example, $sample_dimension_1) may include a simple binary value to indicate whether the user desires that dimension or measure included in the resulting instructions. Thus, the values assigned may include, for example, "true" or "false," "1" or "0," or null or any non-null value.

The token $COLUMN_ALIAS refers to the alias of a column, and may be used, for example, in a SQL "GROUP BY" statement. Transformation of the instruction template to the database instruction replaces the text "$COLUMN_ALIAS:$variable" with the alias of the column defined in the metadata mapping. For example, $COLUMN_ALIAS:$sample_dimension_1 may be replaced by "sample_dimension_1."

$RESTRICTION is used to define a measure condition or dimension condition. The $RESTRICTION token may be associated with a default value to ensure the correctness of a Boolean expression in the database query. Thus, the $RESTRICTION token expression is typically written as $RESTRICTION:DEFAULT=TRUE:$variable or $RESTRICTION:DEFAULT=FALSE:$variable. If a value (for example, a string) is assigned to the meta data mapping associated with $variable, the $RESTRICTION token expression may be re-written during transformation based on the value assigned to the meta data mapping. If no value is assigned to $variable, the $RESTRICTION token express may be re-written during transformation as the default value.

For example, with reference to the above metadata mapping, if a value of "is not 'X'" is assigned to the metadata mapping associated with $sample_dimension_1, the text of $RESTRICTION:DEFAULT=TRUE:$sample_dimension_1 will be replaced with the column name associated with $sample_dimension_1 (for example, column_name_1) and the value assigned to its respective metadata mapping (for example, "is not 'X'"). However, with respect to the text $RESTRICTION:DEFAULT=TRUE:$sample_dimension_2, if no value is assigned to $sample_dimension_2, the text is replaced with the default value (for example, "TRUE"). Thus, if a user is only concerned with sample_dimension_1 and is not concerned with sample_dimension_2 (for example, no value is assigned to its respective metadata mapping), the "WHERE" expression of the above database query template will evaluate correctly because the restriction concerning sample_dimension_2 will always evaluate as TRUE.

In some aspects, a $RESTRICTION token expression may also be assigned an alias. The token $RESTRICTION_ALIAS may be used to refer to that alias in a manner similar to that discussed above with respect to $COLUMN_ALIAS.

In further aspects, an $OPTIONAL token may be used to define an instruction template section. For example, a set of instruction template statements may be offset by a beginning (for example, $OPTIONAL:BEGIN) and an ending (for example, $OPTIONAL:END) to define an optional template section. If the template-tokens within the template-section are not selected (for example, values are not assigned to the variables associated with the template tokens), the template section may be omitted from the database instruction during transformation of instruction template 202. If any of the tokens within the template section have non-null values assigned to an associated variable, the template section may not be omitted.

In the previously described example, the database query template will be transformed to the following SQL query, which can then be issued to the local data store:

```
SELECT
    column_name_1,
    SUM(column_name_3)
FROM
    table
WHERE
    column_name_1 is not 'X' AND
    TRUE
GROUP BY
    column_name_1
HAVING
    SUM(column_name_3)>100 OR
    FALSE
```

In one aspect, an instruction file (for example, an XML file) may store the metadata mapping and/or may also store instruction template 202. For example, as illustrated above, the database query template may be identified as a bit_query element of an XML file (for example, the database query template is set off by <bit_query> opening tag and </bit_query> closing tag).

In a further aspect, a file may further include data regarding how to connect to the database. For example, the file may include the following information:

```
<connection_info>
    <mysql subtype="JDBC" database_name="sample_db"
``` user_name="root" password="password">
        <jdbc>host:port</jdbc>
    </mysql>
</connection_info>
```

By incorporating the metadata mapping, database query template, and database connection information, an instruction file may encapsulate all the information needed to generate a report. One or more servers 101 may not require any intrinsic information about the database or the report, and may only need to understand and interpret the data contained in the instruction file. Thus, the execution of the database instruction (for example, the query generating the report) is completely abstracted from the generation of the database report. A database programmer can thereby expand report options available and databases available to an end user simply by modifying the instruction file and distributing the file to one or more servers 101. A database programmer may not be required to rewrite or modify any of the underlying infrastructure used to interpret the instruction template.

In one aspect, a $VARIABLE template token may also be included in the instruction template as a variable parameter:
    $VARIABLE:variable_type
where 'variable_type' defines the type of variable (for example, "date") that may be used to link the variable token to an user-generated value. For instance, from the previously described example provided in relation to Table 2, a query instruction may be constructed by including two variables, $VARIABLE:date_from two $VARIABLE:date_to, for use with the aggregate function Sum( ):

```
<bit query>
    SELECT
        $COLUMN_SPEC:$column_date_1 AS date_id,
        Sum(if(date>=$VARIABLE:date_from) AND
            date<$VARIABLE:date_to), revenue, 0)
        AS revenue_this_year),
        Sum(if(date>=$VARIABLE:date_from -365) AND
            date<$VARIABLE:date_to -365), revenue, 0)
        AS revenue_last_year),
    FROM
        Table
<\bit_query>
```

With brief reference to FIG. 1, during runtime, user 104 may interact with user interface 108 to input one or more user-generated values. In one aspect, based on the user-generated value, a document object variable(s) 203 may be constructed at run-time by an application executed on one or more servers 101. In one aspect, object variable 203 may be generated by a presentation layer (for example, by JavaScript or server-side scripting) of programming code executed by one or more servers 101. In another aspect, object variable 203 may be generated from a business logic layer or the like. In a further aspect, document object variable 203 may be constructed using a language-independent convention for representing and interacting with objects in HTML, XHTML and XML documents (for example, a Document Object Model). For example, document object variable 203 may be defined in XML according to the following schema:

```
<!--Represents a variable, which is a BIT token not tied to
    any metric or dimension. It gets substituted with user
    entered value a run-time.-->
<xs:complexType name="variable">
    <xs:sequence>
    <!--Variable is hierarchical.-->
        <xs:element name="child_variable" type="variable"
            minOccurs="0" maxOccurs="unbounded"/>
    </xs:sequence>
```

```
<xs:attribute      name="id"      type="identifier"
    use="required"/>
<xs:attribute     name="name"     type="xs:string"
    use="required"/>
<xs:attribute name="description" type="xs:string"/>
<xs:attribute     name="type"     type="data_type"
    use="required"/>
<!--csv string-->
<xs:attribute name="ui_hints" type="ui_hints"/>
</xs:complexType>
```

In one aspect, document object variable 203 includes an object type (for example, corresponding to attribute name="type") and a user-generated value (for example, generated at user-interface 108). Document object variable 203 is received 204 by query generation engine 201 from user interface 107. The subject technology may construct a database instruction (for example, a query) by associating one or more document object variables 203 with instruction template 202. In this regard, the user-generated values within the document object variables are substituted into to the database instruction for each variable token having a :variable_type equal to the object type of the substituted document object variable.

For example, query generation engine 201 may retrieve instruction template 202 and build a database query from template 202, substituting each variable token ($VARIABLE) with a user-generated value from a document object variable 203 having an object type that matches the token's :variable_type attribute. In this regard, multiple document object variables may be provided at runtime (for example, generated via the user interface) to accommodate several variables in an instruction template 202, all without any change to system code. The application then provides 205 the generated query to a database API 206 (for example, ODBC), and API 206 may then be used to query database 103.

Figure 3:
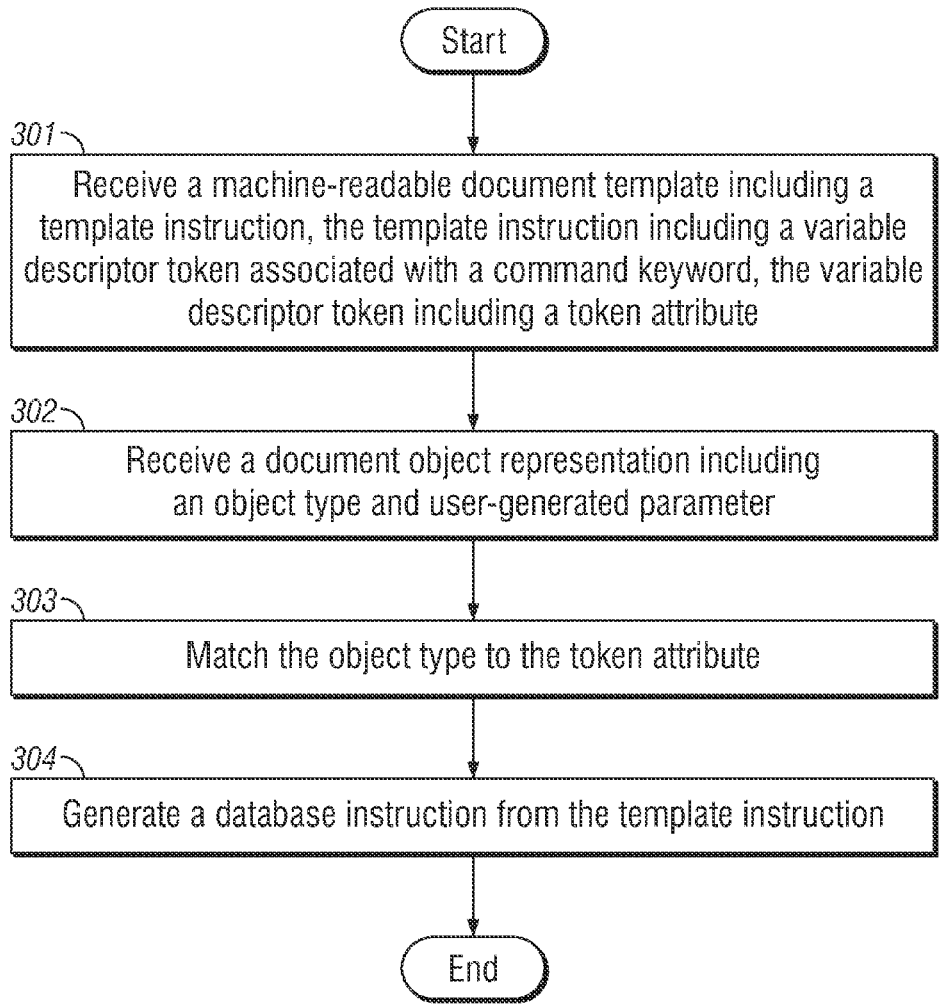
FIG. 3 is a flowchart illustrating a process for dynamically constructing a database instruction according to one aspect of the subject technology.

FIG. 3 is a flowchart illustrating a process for dynamically constructing a database instruction according to one aspect of the subject technology. In a first process 301, the system of the subject technology (for example, including the components of FIG. 2) receives a machine-readable document template including a template instruction. The template instruction may include a command keyword, and a variable descriptor token associated with the command keyword. The variable descriptor token includes a token attribute defining a variable type. In some aspects, the template instruction may further include a target clause. In process 302, the system receives a document object representation including an object type and an user-generated parameter. In process 303, the object type of the document object representation and the token attribute of the variable descriptor token are matched. In process 304, the database instruction is generated from the template instruction. The database instruction may include a command parameter generated by substituting the variable descriptor token with the user generated parameter.

In one example, a computer system (for example, one or more servers 101 of FIG. 1) may include a memory having machine-executable instructions stored thereon, which when executed by a machine or computer cause the machine or computer to perform as a virtual instruction generation engine 201. The system may include one or more processors (for example, processor 401 of FIG. 4) operable to receive data from user interface 108, execute the machine-executable instructions, and read and write to the memory. The one or more processors may further be operable to receive a machine-readable document template 202, including a template instruction (for example, representative of a database instruction), the template instruction including a command keyword and a variable descriptor token (for example, previously described $VARIABLE) associated with the command keyword. The variable descriptor token may include a token attribute defining a variable type (for example, previously described :variable type). As previously described, the template instruction may further include a target clause. The one or more processors may also be operable to receive a document object representation 203 including the object type and an user-generated parameter received from user-interface 108, and to match the object type to a respective token attribute. In one aspect, the one or more processors may be operable to generate a database instruction from the template instruction. In this manner, the database instruction may include a command parameter generated by substituting the variable descriptor token with the user generated parameter.

In other aspects, the one or more processors may be operable to receive the user-generated parameter from user interface 108 and construct document object representation 203 in response to receiving the user-generated parameter, and, in accordance with query generation engine 201, process template 202 and the document object representation 203 to substitute the variable descriptor token with the user generated parameter. Once the database instruction has been constructed, the one or more processors may be operable to provide the database instruction to database server 102 and to receive a response from database server 102.

In some aspects, the command keyword may be a SELECT command wherein the variable descriptor token operates as a placeholder for a parameter of the SELECT command. Likewise, the target clause may include a FROM command. In some aspects, the template instruction may include a database query statement, and, in other aspects, the command keyword may defines an operation of the database query statement. The template instruction may further include more than one variable descriptor token. In this regard, a respective user-generated parameter may be substituted into the database query statement for each variable descriptor token having a token attribute equal to the object type of document object representation 203.

The database instruction may also include an aggregate function (for example, a Sum( ) or date( ) command or the like). More specifically, instruction template 202 may include a generalized query statement (for example, 'SELECT . . . FROM') which may also include, as a query parameter, an aggregate function (for example, sum( )). Accordingly, the aggregate function may further include the previously described command parameter of step 304. In some aspects, the template instruction may include more than one variable descriptor token. For example, a first descriptor token may include a first attribute defining a first date, and a second descriptor token may include a second attribute defining a second date. In this manner, a first object representation and a second object representation may be provided, the first object representation including a first user-generated date and a first object type representative of the first date, and a second object representation including a second user-generated date and a second object type representative of the second date (for example, the document object representation is one of the first and second object representations). Accordingly, generating the database instruction from the template instruction may include substituting the first descriptor token with the first user-generated date and substituting the second descriptor token with the second user-generated date.

Figure 4:
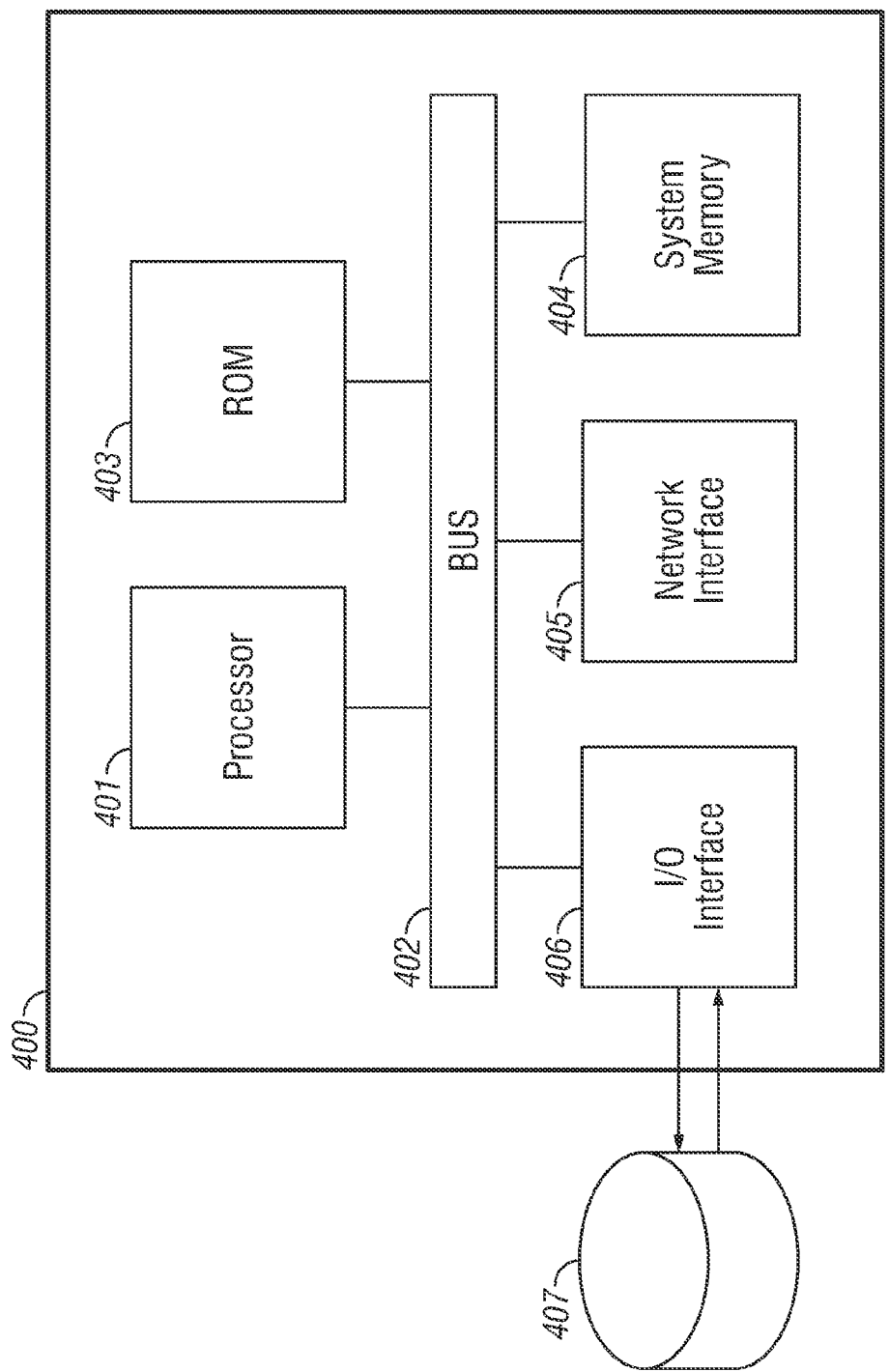
FIG. 4 is a diagram illustrating an exemplary server system for dynamically constructing a database instruction, including a processor and other internal components, according to one aspect of the subject technology. need

FIG. 4 is a diagram illustrating an exemplary server system for dynamically constructing a database instruction, including a processor and other internal components, according to one aspect of the subject technology. As depicted in FIG. 4, in some aspects, server 400 (for example, server 101 or 102, and/or database server 102 or 110, respectively) includes several internal components such as a processor 401, a system bus 402, read-only memory 403, system memory 404, network interface 405, I/O interface 406, and the like. In one aspect, processor 401 may also be communication with a storage medium 407 (for example, a hard drive) via I/O interface 406. In some aspects, all of these elements of server 400 may be integrated into a single server. In other aspects, these elements may be configured as separate components.

Processor 401 may be operable to execute code or instructions to perform the operations and functionality described herein, manage request flow and address mappings, and to perform calculations and generate commands. Processor 401 is configured to monitor and control the operation of the components in server 400. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 401. Likewise, one or more sequences of instructions may be software stored and read from system memory 405, ROM 403, or received from a storage medium 407 (for example, via I/O interface 406). ROM 403, system memory 405, and storage medium 407 represent examples of machine or computer readable media on which instructions/code may be executable by processor 401. Machine or computer readable media may generally refer to any medium or media used to provide instructions to processor 401, including both volatile media, such as dynamic memory used for system memory 404 or for buffers within processor 401, and non-volatile media, such as electronic media, optical media, and magnetic media.

In some aspects, processor 401 is configured to communicate with one or more external devices (for example, via I/O interface 406). Processor 401 is further configured to read data stored in system memory 404 and/or storage medium 407 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like. Alternatively, one or more external devices may include an electronic device such as a digital camera, a digital audio player, a digital video recorder, and the like.

In some aspects, system memory 404 represents volatile memory used to temporarily store data and information used to manage server 400. According to one aspect of the subject technology, system memory 404 is random access memory (RAM) such as double data rate (DDR) RAM. Other types of RAM also may be used to implement system memory 404. Memory 404 may be implemented using a single RAM module or multiple RAM modules. While system memory 404 is depicted as being part of server 400, those skilled in the art will recognize that system memory 504 may be separate from server 500 without departing from the scope of the subject technology. Alternatively, system memory 404 may be a non-volatile memory such as a magnetic disk, flash memory, peripheral SSD, and the like.

I/O interface 406 may be configured to be coupled to one or more external devices, to receive data from the one or more external devices and to send data to the one or more external devices. I/O interface 406 may include both electrical and physical connections for operably coupling I/O interface 406 to processor 401, for example, via the bus 402. I/O interface 406 is configured to communicate data, addresses, and control signals between the internal components attached to bus 402 (for example, processor 401) and one or more external devices (for example, a hard drive). I/O interface 406 may be configured to implement a standard interface, such as Serial-Attached SCSI (SAS), Fiber Channel interface, PCI Express (PCIe), SATA, USB, and the like. I/O interface 406 may be configured to implement only one interface. Alternatively, I/O interface 406 may be configured to implement multiple interfaces, which are individually selectable using a configuration parameter selected by a user or programmed at the time of assembly. I/O interface 406 may include one or more buffers for buffering transmissions between one or more external devices and bus 602 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (for example, arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (for example, his) include the feminine and neuter gender (for example, her and its) and vice versa. Headings and subheadings, if any, are used for convenience only and do not limit the invention.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer implemented method of constructing a database instruction, comprising:
    receiving a user-generated parameter from a user interface;
    constructing, in a memory of a computer, an information object based on an element of the user interface associated with the user-generated parameter, the information object including an object type and the user-generated parameter;
    associating, at runtime, the user-generated parameter with a first template instruction comprising one or more variable tokens each variable token having one or more variable token types, a first variable token occurring more than once in the first template instruction, and a first occurrence of the first variable token having a different variable token type than a second occurrence of the first variable token;
    determining that a section of a plurality of additional template instructions is defined as optional based on detecting an optional begin token and an optional end token that offset the section of additional template instructions, wherein each of the additional template instructions are associated with a respective variable;
    substituting, in the first template instruction, the user generated parameter of the information object for the first variable token; and
    generating a database instruction from at least the first template instruction, at least in part by excluding the additional template instructions from the database instruction based on determining that the information object does not include user-generated parameters for any of the respective variables associated with the additional template instructions.

2. The computer implemented method of claim 1, further comprising:
    querying the database with the database instruction.

3. The computer implemented method of claim 1, wherein the first template instruction includes a database query statement, including a command keyword that defines an operation of the database query statement.

4. The computer implemented method of claim 3, wherein the command keyword is a SELECT command and the first template instruction also includes a FROM command, and wherein at least one of the variable tokens operates as a placeholder for a parameter of the SELECT command.

5. The computer implemented method of claim 1, wherein the database instruction includes an aggregate function, the aggregate function including a command parameter.

6. The computer implemented method of claim 5, wherein the first variable token includes a first attribute, and a second variable token includes a second attribute, the method further comprising:
    receiving a first object representation and a second object representation, the first object representation including a first user-generated date and a first object type representative of the first attribute, and a second object representation including a second user-generated date and a second object type representative of the second attribute, wherein the information object is one of the first and second object representations,
    wherein generating the database instruction from at least the first template instruction includes substituting the first variable token with the first user-generated date and substituting the second variable token with the second user-generated date.

7. The computer implemented method of claim 1, further comprising:
    receiving the user-generated parameter from a presentation interface; and
    constructing the information object in response to receiving the user-generated parameter,
    wherein receiving the information object includes receiving the information object at a query generation engine associated with the computer, the query generation engine processing the first template instruction and the information object to substitute at least one of the variable tokens with the user generated parameter.

8. The computer implemented method of claim 1, further comprising:
    matching, in the first template instruction, the information object to the first variable token based on a matching of the object type and the token type of the first variable token.

9. A machine-readable medium having machine-executable instructions stored thereon, which when executed by a machine or computer cause the machine or computer to perform a method for constructing a database instruction, comprising:
    receiving, at a computer, a user-generated parameter from a user interface;

constructing, in a memory of the computer, a document object representation based on an element of the user interface associated with the user-generated parameter, the document object representation including an object type and the user-generated parameter;

associating, at runtime, the user-generated parameter with a machine-readable document template including a first template instruction, the first template instruction including a command keyword, two or more variable descriptor tokens, and a target clause, each variable descriptor token including a token attribute defining a data type, a first variable descriptor token occurring more than once in the first template instruction, and a first occurrence of the first variable token having a different token attribute than a second occurrence of the first variable token;

determining that a section of a plurality of additional template instructions is defined as optional based on detecting an optional begin token and an optional end token that offset the section of additional template instructions, wherein each of the additional template instructions are associated with a respective variable;

matching the object type and at least one token attribute; and generating the database instruction from at least the first template instruction, at least in part by excluding the additional template instructions from the database instruction based on determining that the information object does not include user-generated parameters for any of the respective variables associated with the additional template instructions, the database instruction including a command parameter generated based on substituting at least one of the variable descriptor tokens with the user-generated parameter.

10. The machine-readable medium of claim 9, wherein the first template instruction includes a database query statement, and the command keyword defines an operation of the database query statement.

11. The machine-readable medium of claim 10, wherein the user-generated parameter is substituted into the database query statement for each variable descriptor token having a token attribute equal to the object type of the document object representation.

12. The machine-readable medium of claim 10, wherein the command keyword is a SELECT command and the target clause includes a FROM command, and wherein the at least one of the variable descriptor tokens operates as a placeholder for a parameter of the SELECT command.

13. The machine-readable medium of claim 10, wherein the database instruction includes an aggregate function, the aggregate function including the command parameter.

14. The machine-readable medium of claim 13, wherein the first variable descriptor token includes a first attribute defining a first date type and a second variable descriptor token includes a second attribute defining a second date type, the method further comprising:

providing a first object representation and a second object representation, the first object representation including a first user-generated date and a first object type equal to the first attribute, and a second object representation including a second user-generated date and a second object type equal to the second attribute, wherein the document object representation is one of the first and second object representations;

wherein generating the database instruction from at least the first template instruction includes substituting the first descriptor token with the first user-generated date and substituting the second descriptor token with the second user-generated date.

15. The machine-readable medium of claim 9, the method further comprising:

receiving the user-generated parameter from a presentation interface; and constructing the document object representation in response to receiving the user-generated parameter, wherein the document object representation is received at a query generation engine, the query generation engine processing the machine-readable document template and the document object representation to substitute the at least one of the variable descriptor tokens with the user generated parameter.

16. A system for constructing a database instruction, comprising:

a memory including machine-executable instructions operable, when executed, to perform as a virtual query generation engine;

a presentation interface;

one or more processors operable to receive data from the presentation interface, execute the machine-executable instructions, and read and write to the memory, the one or more processors being further operable to:

receive a user-generated parameter from a user interface;

construct, by the virtual query generation engine, an information object based on an element of the user interface associated with the user-generated parameter, the information object including an object type and the user-generated parameter;

associate, at runtime, the user-generated parameter with a first template instruction comprising a metadata mapping file of a data model for a database and having more than one variable tokens, each variable token having one or more variable token types, a first variable token occurring more than once in the first template instruction, and a first occurrence of the first variable token having a different variable token type than a second occurrence of the first variable token;

determine that a section of a plurality of additional template instructions is defined as optional based on detecting an optional begin token and an optional end token that offset the section of additional template instructions, wherein each of the additional template instructions are associated with a respective variable;

match the information object to one or more of the variable tokens in the first template instruction;

generate a database instruction by at least substituting the one or more of the variable tokens in the first template instruction with the user generated parameter and by excluding the additional template instructions from the database instruction based on determining that the information object does not include user-generated parameters for any of the respective variables associated with the additional template instructions; and query the database using the database instruction.

17. The system of claim 16, wherein the first template instruction includes a command keyword, a variable descriptor token associated with the command keyword, and a target clause, the one or more processors being further operable to:

receive a machine-readable document template including at least the first template instruction and the additional template instructions.

18. The system of claim 17, wherein the first template instruction includes a database query statement and the command keyword defines an operation of the database query statement.

19. The system of claim 18, wherein the user-generated parameter is substituted into the database query statement for each variable token having a token attribute equal to an object type of the information object.

20. The system of claim 18, wherein the command keyword is a SELECT command and the target clause includes a FROM command, and wherein the variable token associated with the command keyword operates as a placeholder for a parameter of the SELECT command.

21. The system of claim 18, wherein the database instruction includes an aggregate function, the aggregate function including a command parameter.

22. The system of claim 21, wherein the first variable token includes a first attribute and a second variable token includes a second attribute, the one or more processors being further operable to:
　　receive a first object representation and a second object representation, the first object representation including a first user-generated date and a first object type equal to the first attribute, and a second object representation including a second user-generated date and a second object type equal to the second attribute, wherein the information object is one of the first and second object representations,
　　wherein the one or more processors being operable to generate the database instruction includes the one or more processors being operable to substitute the first variable token with the first user-generated date and substitute the second variable token with the second user-generated date.

23. The system of claim 16, the one or more processors being further operable to:
　　receive the user-generated parameter from the presentation interface; and
　　construct the information object in response to receiving the user-generated parameter,
　　wherein the one or more processors is operable, in accordance with the virtual query generation engine, to process the machine-readable document template and the information object to substitute at least one of the variable tokens with the user generated parameter.

* * * * *